No. 783,793. PATENTED FEB. 28, 1905.
C. MILLER.
TIRE.
APPLICATION FILED FEB. 17, 1904.

WITNESSES:
John J. Kittle
Isaac B. Owens

INVENTOR
Charles Miller
BY
ATTORNEYS

No. 783,793.                                           Patented February 28, 1905.

UNITED STATES PATENT OFFICE.

CHARLES MILLER, OF BINGHAMTON, NEW YORK.

TIRE.

SPECIFICATION forming part of Letters Patent No. 783,793, dated February 28, 1905.

Application filed February 17, 1904. Serial No. 193,951.

*To all whom it may concern:*

Be it known that I, CHARLES MILLER, a citizen of the United States, and a resident of Binghamton, in the county of Broome and State of New York, have invented a new and Improved Tire, of which the following is a full, clear, and exact description.

This invention relates generally to a cushion-tire formed of an outer casing and an elastic chambered core—such, for example, as that disclosed in my prior patent, No. 743,309, dated November 3, 1903.

The prime object of this invention is to devise means for securing the casing and core to the rim of the wheel in such a manner as to retain fully the desired cushioning effect of the tire and yet to prevent all creeping and other movements tending to displace or in any manner disturb the proper position of the tire on the rim. This end I attain by employing, in addition to the usual side clamps, an interior clamping device, which coacts with the side clamps not only in holding the casing, but also in holding the elastic core. Preferably the clamping device comprises two strips of wood or other material which bear on the sides of a longitudinal rib on the core and between the sides of the casing, all of said parts being pressed laterally together by the side clamps and the strips being drawn in against the rim by radial fastenings passing therethrough.

This specification is an exact description of one example of my invention, while the claims define the actual scope thereof.

Reference is to be had to the accompanying drawings forming a part of this specification, in which similar characters of reference indicate corresponding parts in all the views.

Figure 1:
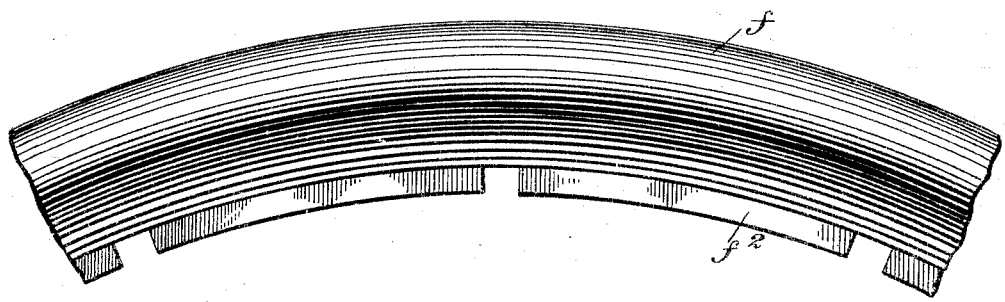
Figure 2:
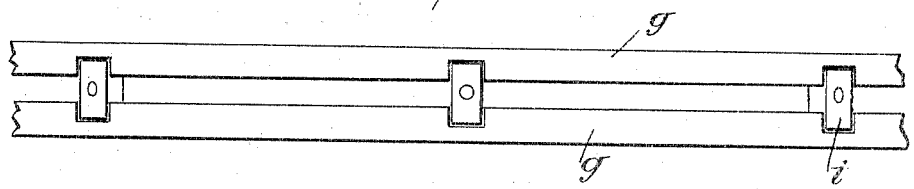
Figure 3:
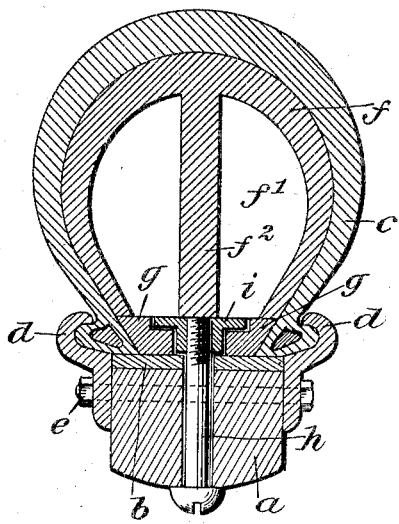

Figure 1 is a side view of the tire disconnected from the rim. Fig. 2 is a plan view of the interior clamping device. Fig. 3 is a cross-section of the complete tire, and Fig. 4 is a cross-section of a modification.

Referring to Figs. 1, 2, and 3, $a$ indicates the rim of the wheel, having a metal, wooden, or other band $b$ extending around its periphery, the band $b$ constituting, as far as my invention is concerned, but a part of the rim, which may be of any construction desired. $c$ indicates the casing, which is constructed of rubber and is here illustrated as of the clencher type. With the enlarged inner edges of the casing $c$ clamps $d$ are engaged, these clamps being fitted to the sides of the rim $a$ and drawn up into position by fastenings $e$ in the usual manner. $f$ indicates the resilient or elastic core, which, as disclosed in my prior patent, No. 743,309, dated November 3, 1903, has an outer shell with transverse partitions $f'$ and a longitudinal partition $f^2$, giving the core a cellular form and providing a strong and highly-resilient structure. The said core is inclosed within the casing $c$, and the rib $f^2$ is projected inward beyond the inner edges of the sides of the core, as indicated in Fig. 1. The projected central rib $f^2$ bears against the outer periphery of the rim of the wheel, and on each side of the rib $f^2$ are clamping-strips $g$, which may be of any material desired and which extend circumferentially around the wheel. The side edges of the core $f$ bear on the strips $g$, while said strips lie between the inner side portions of the casing $c$ opposite the clamps $d$, as shown. The strips $g$ are spaced apart and are drawn forcibly into engagement with the rim of the wheel by means of fastening-bolts $h$, passing radially through the rim and engaging at their inner ends nuts $i$, which set between the strips $g$ and have portions bearing on the outer surfaces thereof, these nuts therefore spacing the strips from each other and drawing them inward against the rim. It will therefore be seen that by this construction upon tightening the clamps $d$ the enlarged portions at the inner edges of the sides of the casing will be compressed between the clamps and the strips $g$, thus effecting the most secure connection between these parts. Simultaneously the strips $g$ will be compressed against the projected central partition $f^2$, forming the rib at the inner periphery of the core, and thus fastening the core securely between the strips, which are in turn fastened to the rim $a$. In this manner not only is the casing secured to the rim more securely than heretofore, but the core itself is fastened in proper position on the wheel. This avoids creeping and other independent movements of the tire parts with respect to the wheel and insures a serviceable tire. In connection with Fig. 3 attention is also called to the fact that the outer side walls of the strips $g$ are undercut slightly, so that these walls coacting with the enlarged inner side portions of the casing still further insure the secure connection between the casing and rim.

Figure 4:
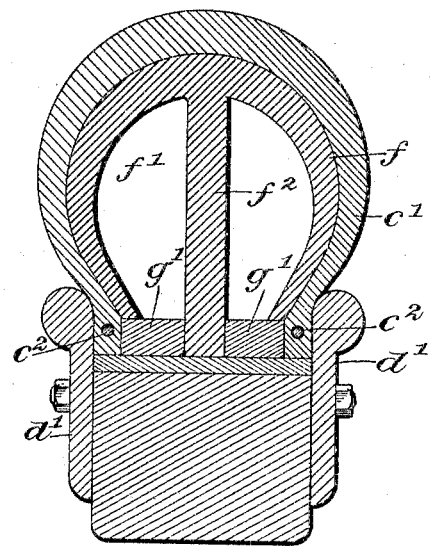

Fig. 4 shows my invention used in connection with a Dunlap casing $c'$, which is provided with wires $c^2$, embedded in its inner side edges, so as to afford a gripping-surface for the side clamps $d'$. The core $f$ may be of the same construction as that shown in Figs. 1 and 3 and bears the same relation to the interior clamping-strips $g'$, as before explained. Said clamping-strips $g'$ in Fig. 4 may or may not be used in connection with the fastening-bolts $h$ and nuts $i$, hereinbefore described.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination with a wheel-rim, of a casing, a resilient core-body inclosed by the casing, said core having a longitudinally-extending rib, exterior clamping means, and interior clamping means coacting therewith to secure the casing and the core-body to the rim.

2. The combination with the wheel-rim, of a casing, a core having a longitudinal rib, exterior clamping means, and interior clamping means comprising two strips and fastenings for drawing the strips against the rim, said strips lying within the casing and respectively against the sides of the longitudinal rib of the core, and said clamping means coacting to secure the casing and core to the rim.

3. The combination with the wheel-rim, of a casing, a core having a longitudinal rib with notches therein, exterior clamping means and interior clamping means comprising strips bearing within the casing respectively on the sides of the rib of the core, nuts lying in the notches of the rib and bearing on and between the strips, and fastening-bolts passing through the rim and engaged with the nuts, said exterior and interior clamping means coacting to secure the casing and core to the rim.

4. A resilient core for cushion-tires, comprising a core-body and a central longitudinally-extending partition in said core-body, said partition having its inner edge forming a projecting rib, said rib being notched.

5. A resilient cellular core for cushion-tires, said core comprising a core-body, transverse ribs extending across the same, and a longitudinal rib extending through the core-body, the rib having one edge projected beyond the core-body and formed with notches therein.

6. The combination with a cushion-tire and the rim of a wheel having securing means for said tire, of a resilient core for the tire, comprising a core-body and a longitudinal partition connected to the inner wall of said body at its central or tread portion and extending inwardly beyond the inner circumference of the body to form an inwardly-projecting portion, and internal securing means for engaging said projecting portion, and holding the same in engagement with the rim of the wheel, to assist in holding the tire upon the wheel.

In testimony whereof I have signed my name to this specification in the presence of two subscribing witnesses.

CHARLES MILLER.

Witnesses:
  WILLIS D. VAN DUSEN,
  ALMIRON M. SPENG.